(12) United States Patent
Hui

(10) Patent No.: US 8,824,580 B2
(45) Date of Patent: Sep. 2, 2014

(54) COMMUNICATING OVER A DESIRED TONE IN THE PRESENCE OF INTERFERENCE HAVING AN UNKNOWN MAGNITUDE THAT IS SUBSTANTIALLY CONSTANT

(75) Inventor: Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/584,082

(22) Filed: Aug. 13, 2012

(65) Prior Publication Data

US 2014/0044202 A1 Feb. 13, 2014

(51) Int. Cl.
*H04K 1/10* (2006.01)
*H04L 27/28* (2006.01)

(52) U.S. Cl.
USPC .......... 375/260; 370/210; 370/208; 455/63.4; 455/69; 455/59

(58) Field of Classification Search
CPC ......... H04B 7/0848; H04L 5/023; H04K 1/10
USPC ............. 375/260; 370/210.208; 455/63.4, 69, 455/59, 562
See application file for complete search history.

(56) References Cited

U.S. PATENT DOCUMENTS

| 7,773,679 B2 | 8/2010 | Laroia et al. | |
| 2007/0009053 A1* | 1/2007 | Laroia et al. | 375/260 |
| 2008/0212695 A1* | 9/2008 | Mo et al. | 375/260 |
| 2009/0323510 A1* | 12/2009 | Furrer et al. | 370/210 |
| 2013/0039446 A1* | 2/2013 | Roh | 375/340 |

FOREIGN PATENT DOCUMENTS

WO 2011009239 A1 1/2011

OTHER PUBLICATIONS

International Search Report and Written Opinion for PCT/IB2013/056593 mailed Feb. 10, 2014, 13 pages.

* cited by examiner

*Primary Examiner* — Sam K Ahn
*Assistant Examiner* — Fabricio R Murillo Garcia
(74) *Attorney, Agent, or Firm* — Withrow & Terranova, PLLC

(57) ABSTRACT

Methods and systems are disclosed for transmitting data over a desired frequency tone in the presence of an interference that has an unknown magnitude that is substantially constant. In general, data symbols are transmitted in a null space of the desired frequency tone. The null space of the desired frequency tone is orthogonal to the desired frequency tone. As such, the data symbols transmitted in the null space of the desired frequency tone are not interfered with by the interference at the desired frequency tone regardless of the magnitude of the interference. The data symbols transmitted in the null space of the desired frequency tone can then be recovered by a receiver without estimation of or compensation for the interference at the desired frequency tone.

34 Claims, 11 Drawing Sheets

COMMUNICATING OVER A DESIRED TONE IN THE PRESENCE OF INTERFERENCE HAVING AN UNKNOWN MAGNITUDE THAT IS SUBSTANTIALLY CONSTANT

FIELD OF THE DISCLOSURE

The present disclosure relates to transmitting and receiving data over a desired frequency tone in the presence of interference that has an unknown magnitude that is substantially constant.

BACKGROUND

Direct conversion, or homodyne, radio front-end architectures have become very popular, particularly for mobile terminals, because they are power efficient and cost effective. A direct conversion receiver downconverts a received radio frequency signal directly to baseband without any use of intermediate frequencies. As such, the number of circuit components needed for the direct conversion receiver is reduced as compared to a conventional heterodyne receiver. Similarly, a direct conversion transmitter upconverts a baseband signal directly to a radio frequency signal without any use of intermediate frequencies. As such, the number of circuit components needed for the direct conversion transmitter is also reduced as compared to a conventional heterodyne transmitter.

However, direct conversion front-end architectures often suffer from a DC-offset of an unknown magnitude, where the DC offset is a by-product of the direct conversion process. The DC offset mainly stems from three sources: (1) Local Oscillator (LO) signal leaking to, and reflecting from, the antenna and self-downconverting to DC through a mixer used for downconversion, (2) a large near-channel interferer leaking into the LO and self-downconverting to DC, and (3) transistor mismatch in the signal path. The leakage in (2) and (3) can be reduced to some extent by careful front-end design. Nevertheless, if the DC-offset is not completely eliminated in the receiver front-end, then baseband processing must compensate for the remaining DC-offset. This often causes undesirable complication in various aspects of the baseband algorithm design, especially for an advanced receiver, and leads to an increase in complexity and cost of the receiver.

To avoid dealing with the DC-offset issue, in many Orthogonal Frequency Division Multiplexing (OFDM) based wireless communication standards where the frequency band is subdivided into multiple subcarriers, the subcarrier at the DC tone (i.e., the DC subcarrier) is left idle and is not used for communications between base stations and mobile terminals across the entire network. For example, the DC subcarrier is left idle and is not used in Long Term Evolution (LTE) and WiMAX wireless communication standards. This is clearly not an efficient solution for utilizing the DC subcarrier, which is a valuable radio resource.

As the unknown DC offset typically stays substantially constant for a number of transmission time periods, U.S. Pat. No. 7,773,679 to Laroia et al. discloses a base station in an OFDM-based communication system that every so often does not transmit on the downlink DC tone, or DC subcarrier, while continuing to transmit on other downlink tones. A mobile terminal measures received signal on the downlink DC tone during the time in which transmission is suspended on the downlink DC tone (i.e., the suspended DC tone transmission period) to thereby estimate the DC offset resulting from self-interference at the mobile terminal. The mobile terminal then compensates for the DC offset by subtracting the estimate of the DC offset from the signal received during the time in which transmission is active on the downlink DC tone (i.e., the active DC tone transmission period). A drawback of this method is that there is a residual DC offset after compensation that relies heavily on the accuracy of the estimate of the DC offset. This residual DC offset results in performance degradation. Further, in order for the mobile terminal to obtain adequate accuracy for the estimate of the DC offset, the suspended DC tone transmission period is required to be rather long, which in turn limits the achievable spectral efficiency. Moreover, all the signals received over all symbol periods also need to be buffered until an accurate estimate of the DC offset can be generated and compensation of the DC offset can begin.

U.S. Pat. No. 7,773,679 to Laroia et al. also discloses that, for the uplink where the DC offset in the signal received by the base station may be attributed to multiple scheduled mobile terminals (as well as the base station if a homodyne receiver architecture is used), a special symbol that is equal to the negative average of the previously transmitted N−1 data symbols is transmitted in every N-th symbol, where N is a predetermined integer. The receiver at the base station estimates the unknown DC offset from a weighted sum of the signals received over a frame of N symbols. This method again requires the implementation of a separate module for DC estimation, and the receiver performance is directly affected by the accuracy of the DC estimate.

As such, there is a need for systems and methods for transmitting data in the presence of interference (e.g., a DC offset) that has an unknown magnitude that is substantially constant without requiring estimation of or compensation for the interference at the receiver.

SUMMARY

Systems and methods are disclosed for transmitting data over a desired frequency tone in the presence of an interference that has an unknown magnitude that is substantially constant. In general, data symbols are transmitted in a null space of the desired frequency tone. The null space of the desired frequency tone is orthogonal to the desired frequency tone. As such, the data symbols transmitted in the null space of the desired frequency tone are not interfered with by the interference at the desired frequency tone regardless of the magnitude of the interference. The data symbols transmitted in the null space of the desired frequency tone can then be recovered by a receiver without estimation of or compensation for the interference at the desired frequency tone.

In one embodiment, a transmitter generates a signal that includes a number, N−1, of data symbols in a null space of a desired frequency tone and transmits the signal. In one embodiment, the transmitter transmits a multi-subcarrier signal, and the desired frequency tone is one of a number of subcarriers of the multi-subcarrier signal. As such, the signal that includes the data symbols in the null space of the desired frequency tone is a signal carried by the corresponding subcarrier of the multi-subcarrier signal. The multi-subcarrier signal may be, for example, an Orthogonal Frequency Division Multiplexing (OFDM) signal. In one embodiment, the desired frequency tone is a DC subcarrier of the multi-subcarrier signal, and the interference is an unknown DC offset. In another embodiment, the desired frequency tone is a non-DC subcarrier of the multi-subcarrier signal.

In one embodiment, a transmitter generates a signal that includes a number, N−1, of data symbols in a null space of a desired frequency tone such that each data symbol is carried across a number, N, of transmission time periods for the desired frequency tone by a different basis vector in a set of basis vectors that characterize the null space of the desired frequency tone. More specifically, in one particular embodiment, for each k-th transmission time period where k=1, 2, ..., N, the transmitter weights each data symbol according to a k-th element of a different basis vector in the set of basis vectors that characterize the null space of the desired frequency tone to thereby provide weighted data symbols for the k-th transmission time period. For each k-th transmission time period, the transmitter linearly combines the weighted data symbols for the k-th transmission time period to provide a signal component for the k-th transmission time period for the desired frequency tone. Together, the signal components for the transmission time periods provide the signal that includes the data symbols in the null space of the desired frequency tone. The transmitter then transmits the signal. In one embodiment, the transmitter transmits a multi-subcarrier signal, and the desired frequency tone is one of a number of subcarriers of the multi-subcarrier signal. As such, the signal that includes the data symbols in the null space of the desired frequency tone is a signal carried by the corresponding subcarrier of the multi-subcarrier signal. The multi-subcarrier signal may be, for example, an OFDM signal. In one embodiment, the desired frequency tone is a DC subcarrier of the multi-subcarrier signal, and the interference is an unknown DC offset. In another embodiment, the desired frequency tone is a non-DC subcarrier of the multi-subcarrier signal.

In another embodiment, a receiver is configured to receive a signal that includes data symbols transmitted in a null space of a desired frequency tone and recover the data symbols from the signal. Since the data symbols are transmitted in the null space of the desired frequency tone, the receiver can recover the data symbols in the presence of an interference at the desired frequency tone that has an unknown magnitude that is substantially constant without estimation of and compensation for the interference at the desired frequency tone.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 10:
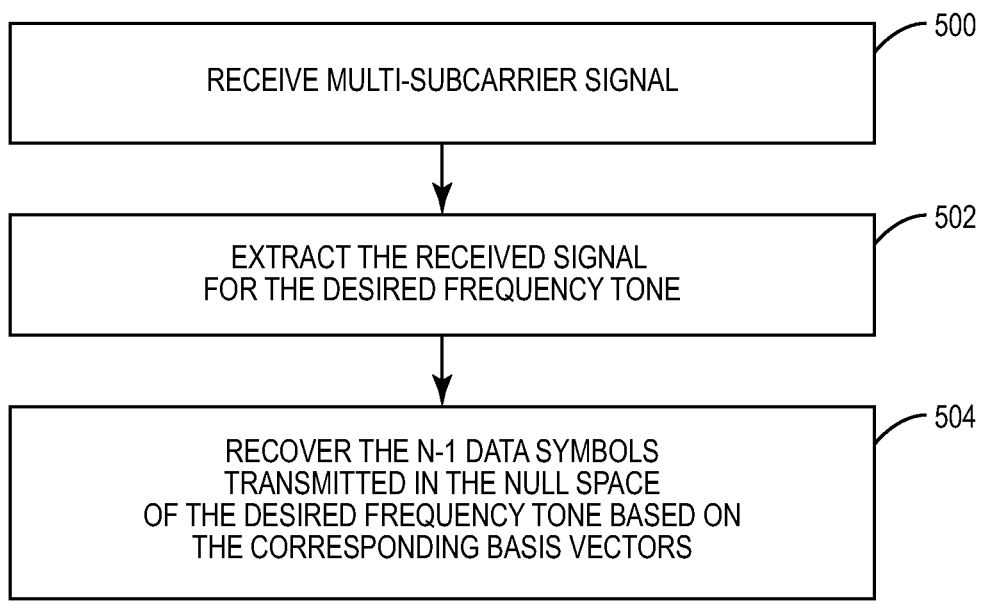
Figure 11:
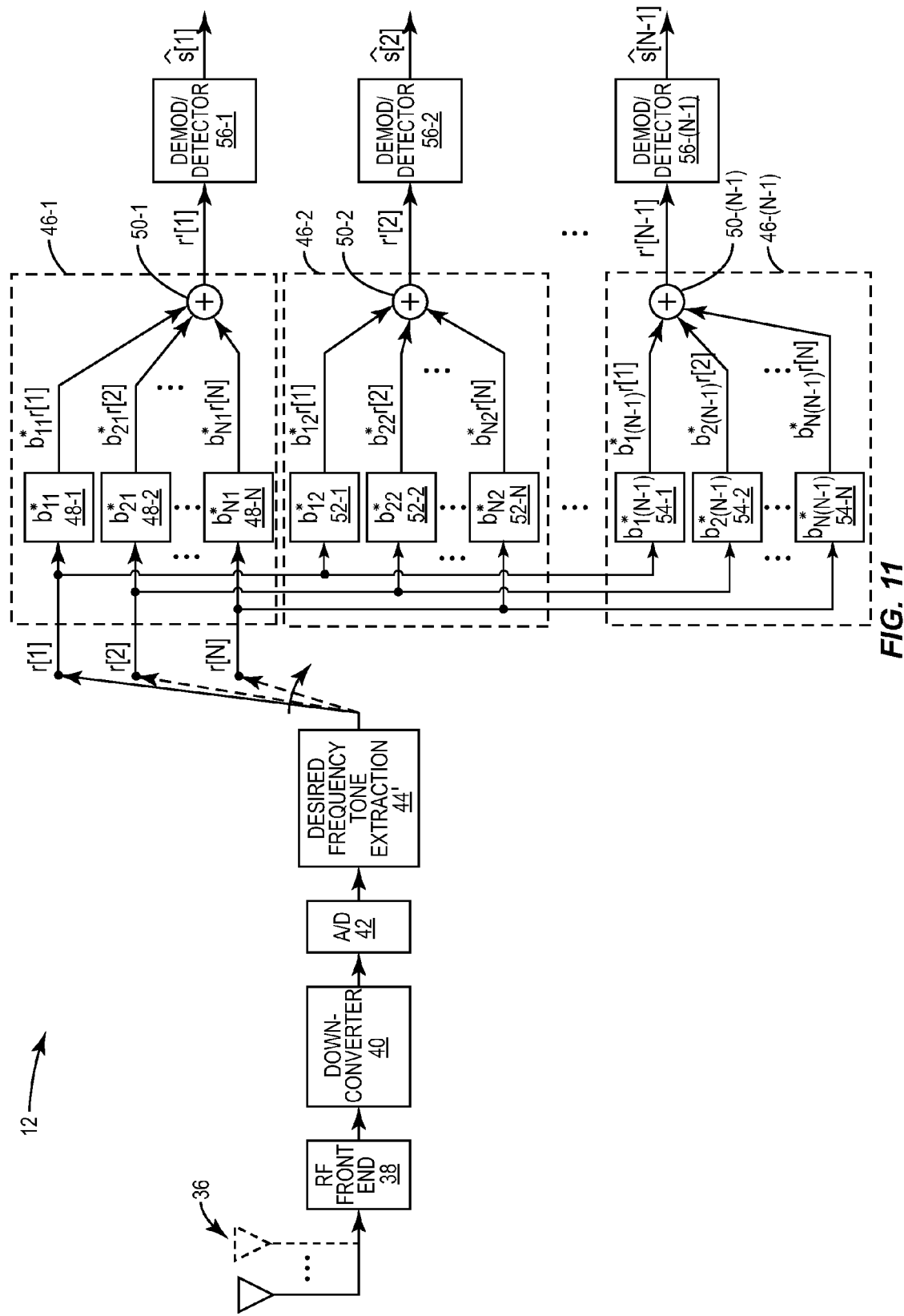

FIG. 10 is a flow chart that illustrates a process for receiving data symbols transmitted in a null space of a desired frequency tone, or desired subcarrier, of a multi-subcarrier signal where the desired frequency tone is either a DC tone or a non-DC tone according to one embodiment of the present disclosure; and FIG. 11 is a block diagram of a receiver that receives data symbols transmitted in a null space of a desired frequency tone, or desired subcarrier, of a multi-subcarrier signal where the desired frequency tone is either a DC tone or a non-DC tone according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for transmitting data over a desired, predetermined frequency tone in the presence of an interference that has an unknown magnitude that is substantially constant. In general, data symbols are transmitted in a null space of the desired frequency tone. The null space of the desired frequency tone is orthogonal to the desired frequency tone. As such, the data symbols transmitted in the null space of the desired frequency tone are not interfered with by the interference at the desired frequency tone regardless of the magnitude of the interference. The data symbols transmitted in the null space of the desired frequency tone can then be recovered by a receiver without estimation of or compensation for the interference at the desired frequency tone.

Figure 1:
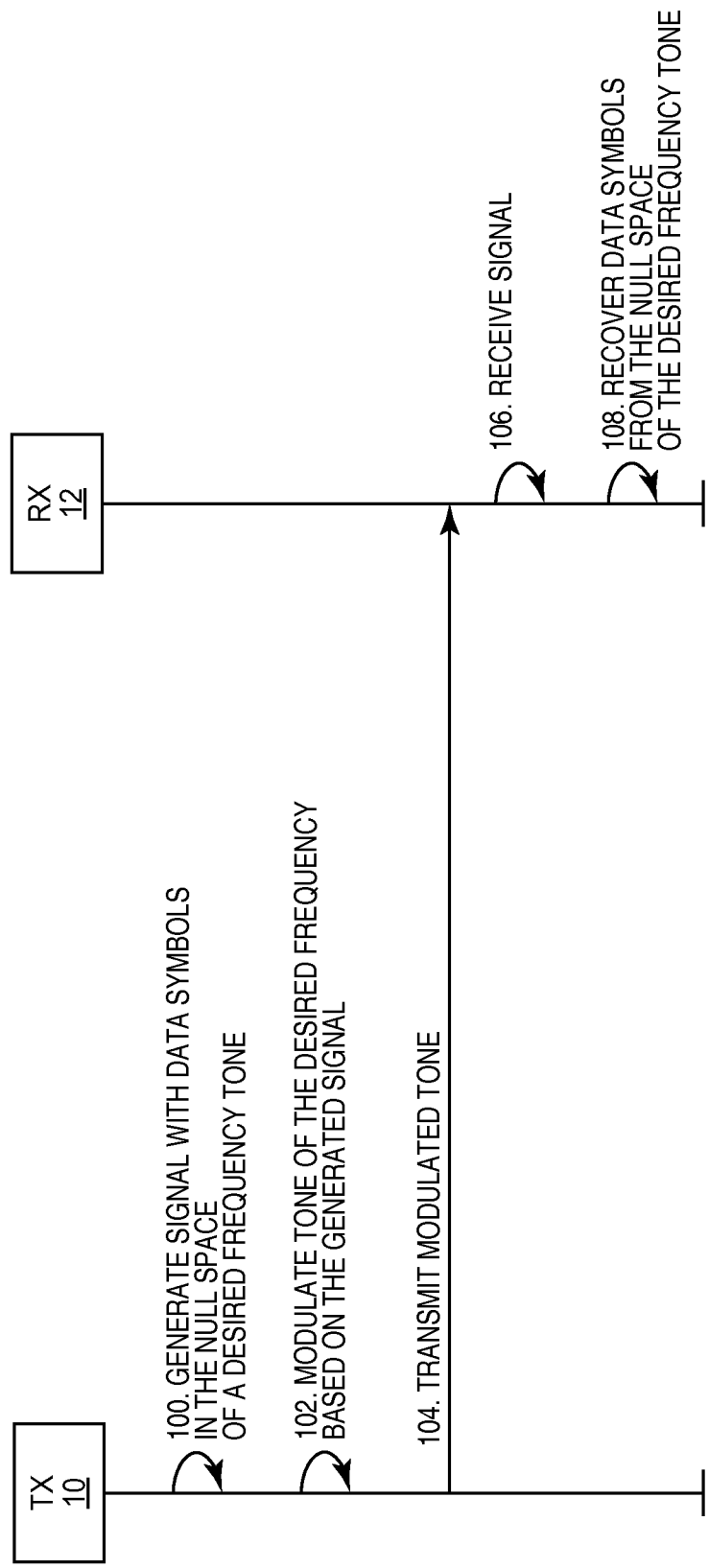
FIG. 1 illustrates a system in which data is transmitted in a null space of a desired frequency tone according to one embodiment of the present disclosure.

In this regard, FIG. 1 illustrates the operation of a wireless transmitter 10 and a wireless receiver 12 to transmit and receive data symbols over a desired, predetermined frequency tone in the presence of interference that has an unknown magnitude that is substantially constant over a number, N, of transmission time periods according to one embodiment of the present disclosure. In one embodiment, the interference is "substantially constant" if a ratio of an arithmetic mean and a geometric mean of the magnitude of the interference over the number, N, of transmission time periods is approximately equal to 1. The ratio is approximately equal to 1 if the ratio is equal to 1 plus or minus a predetermined delta, where the delta depends on the particular implementation. As an example, the delta may be 0.001.

As illustrated, the wireless transmitter 10 generates a signal that includes data symbols in a null space of a desired frequency tone (step 100). In one embodiment, the desired frequency tone is a DC tone. In another embodiment, the desired frequency tone is a non-DC tone. As used herein, the "null space" of the desired frequency tone is a vector space that is orthogonal to the desired frequency tone. In other words, as should be well understood to those skilled in the basic theory of linear algebra, the "null space" comprises the set of all signals that yield a zero inner-product with (i.e., are orthogonal to) the desired frequency tone for a certain given inner-product, which can be used to define a vector space. As discussed below in detail, the null space of the desired frequency tone is characterized by a set of basis vectors. The wireless transmitter 10 generates the signal such that each of N−1 data symbols is carried across the N transmission time periods using a different basis vector from the set of basis vectors that characterize the null space of the desired frequency tone.

For each of the N transmission time periods, the wireless transmitter 10 then modulates a tone of the desired frequency based on the generated signal (step 102). In one embodiment, the wireless transmitter 10 transmits the modulated tone as part of a multi-carrier signal such as, for example, an Orthogonal Frequency Division Multiplexing (OFDM) signal. More specifically, the modulated tone is one of the subcarriers of the multi-carrier signal and, as such, the signal that includes the data symbols in the null space of the desired frequency tone is a signal carried over the corresponding subcarrier of the multi-subcarrier signal. Additionally, in particular embodiments, the wireless transmitter 10 may represent a homodyne transmitter. In such embodiments, modulating the tone may include upconverting the generated signal (that includes the N−1 data symbols) directly to a radio frequency signal at the predetermined frequency without any use of intermediate frequencies. The wireless transmitter 10 may then transmit the modulated tone (step 104). The wireless receiver 12 receives the signal (step 106) and recovers the data symbols transmitted in the null space of the desired frequency tone (108). Since the data symbols are in the null space of the desired frequency tone, the data symbols will not be interfered with by the interference at the desired frequency tone regardless of the magnitude of the interference. As such, the wireless receiver 12 can recover the data symbols without estimation of or compensation for the interference at the desired frequency tone. More specifically, as discussed below in detail, the wireless receiver 12 recovers the N−1 data symbols by combining and scaling the signal received over the N transmission time periods.

Notably, transmission and reception scheme of FIG. 1 can, among other things, enable communication between base stations and mobile terminals in a cellular communication network that operates according to a multi-subcarrier communication standard (e.g., an OFDM-based communication standard such as, for example, Long Term Evolution (LTE) or WiMAX) to communicate over the DC tone, or DC subcarrier. Communication over the DC tone may, for example, enable a separate and possibly proprietary logical channel for communication between base stations and mobile terminals or between mobile terminals. Moreover, in a cellular communication system, different basis vectors may be used in adjacent cells or the same basis vectors may be shared between adjacent cells (e.g., adjacent cells share the same basis vectors but transmissions in the adjacent cells use different transmission time periods). Similarly, the transmission and reception scheme of FIG. 1 can, among other things, enable mobile-to-mobile communications to piggyback over an existing multi-subcarrier communication system that does not use the desired frequency tone (e.g., the DC tone in LTE or WiMAX) without causing interference to other subcarriers.

Figure 2:
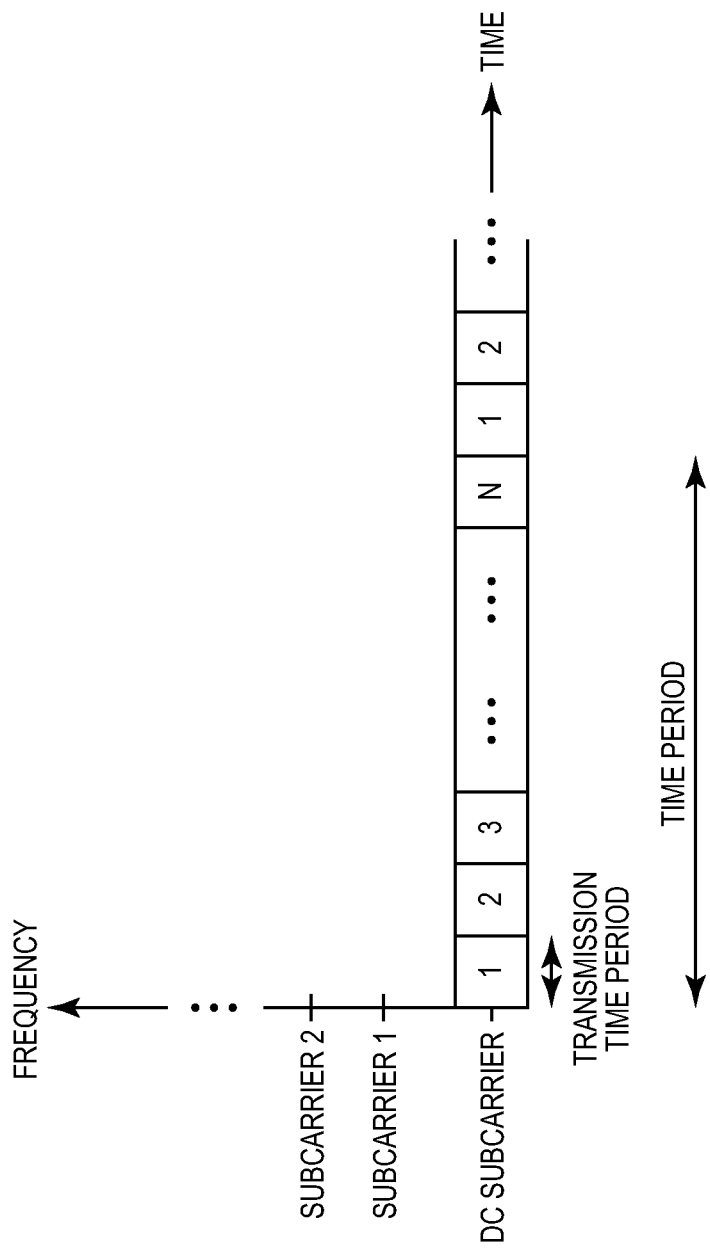
FIG. 2 illustrates a number, N, of transmission time periods in which a number, N−1, of data symbols are transmitted in a null space of a DC tone according to one embodiment of the present disclosure.

FIG. 2 graphically illustrates a time period that includes N transmission time periods in which N−1 data symbols are transmitted over the null space of the DC tone, or DC subcarrier, of a multi-subcarrier signal according to one embodiment of the present disclosure. Let $\{s[n]\}_{n=1}^{N-1}$ denote the number, N−1, of data symbols to be transmitted in the null space of the DC tone over the time period of N transmission time periods (e.g., N OFDM symbol periods) over which an unknown DC offset remains substantially constant in a corresponding multi-subcarrier communication system (e.g., an OFDM communication system). Let $B \equiv \{b_i\}_{i=1}^{N-1}$ denote a set of mutually orthogonal N×1 vectors of unit norm, each having its vector components summed to zero. In other words, each vector $b_i \equiv (b_{1i}, b_{2i}, \ldots, b_{Ni})^T$ in B satisfies:

$$\sum_{k=1}^{N} b_{ki} = 0 \tag{1}$$

and $$\sum_{k=1}^{N} b_{ki}^* b_{km} = \delta(i-m)$$

for all i=1, 2, ..., N−1 and m=1, 2, ..., N−1. The set B so constructed forms a basis for the null space of the DC tone. As such, the set B is also referred to herein as a set of basis vectors B that characterize the null space of the DC tone, and each vector $b_i$ is also referred to herein as a basis vector.

In one particular embodiment, Equation (1) is satisfied by selecting values for the set of basis vectors B according to:

$$b_{ki} = \frac{1}{\sqrt{N}} \exp\left\{-j\frac{2\pi ki}{N}\right\} \tag{2}$$

for i=1, 2, ..., N−1 and k=1, 2, ..., N. More generally, the set of basis vectors B may be a set of N−1 columns of an N×N Fast Fourier Transform (FFT) matrix that do not have identical elements normalized so that each basis vector has a unit norm. In another particular embodiment, if N is an integer power of two, Equation (1) can be satisfied by selecting $\{b_i\}_{i=1}^{N-1}$ as those N−1 columns of a N×N Walsh-Hadamard matrix that do not have identical elements. Notably, these embodiments of the set of basis vectors B are only two examples. Other values that satisfy Equation (1) above may be selected for the set of basis vectors B.

In operation, each of the N−1 basis vectors in B is used to carry one of the data symbols $\{s[n]\}_{n=1}^{N-1}$ to be transmitted over the time period of N n=1 transmission time periods. Specifically, in the k-th transmission time period, the wireless transmitter 10 sends a linear combination of all of the data symbols $\{s[n]\}_{n=1}^{N-1}$ weighted accordingly by $\{b_{kn}\}_{n=1}^{N-1}$ to the wireless receiver 12 over the DC n=tone, where the linear combination provides a "signal component" for the DC tone given by:

$$x[k] = \sum_{n=1}^{N-1} b_{kn} s[n] \quad (3)$$

for k=1, 2, ..., N. Note that since x[k] is only transmitted over the DC tone of the k-th transmission time period, it does not cause any interference to non-DC tones, or non-DC subcarriers. Together, the N signal components x[k] for k=1, 2, ..., N form a signal x that includes data symbols in the null space of the DC tone.

Figure 3:
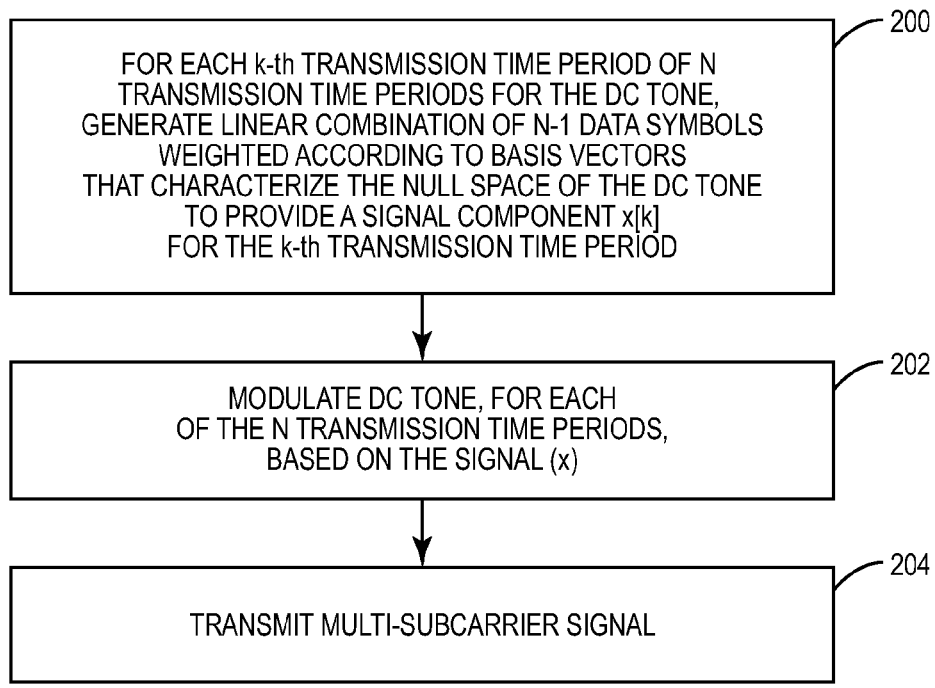
FIG. 3 is a flow chart that illustrates a process for transmitting data symbols in a null space of a DC tone, or DC subcarrier, of a multi-subcarrier signal according to one embodiment of the present disclosure.

FIG. 3 is a flow chart that illustrates the operation of the wireless transmitter 10 of FIG. 1 to utilize the algorithm described above to generate and transmit a signal that includes data symbols in the null space of the DC tone according to one embodiment of the present disclosure. First, for each k-th transmission time period of the N transmission time periods, the wireless transmitter 10 generates the linear combination of all of the N−1 data symbols $\{s[n]\}_{n=1}^{N-1}$ weighted according to the basis vectors that characterize the null space of the DC tone to provide the signal component x[k] for the k-th transmission time period, as described above with respect to Equation (3) (step 200). Again, together, the N signal components x[k] for k=1, 2, ..., N form a signal x that includes N−1 data symbols in the null space of the DC tone. Next, in this embodiment, the wireless transmitter 10 modulates a DC tone, for each of the N transmission time periods, based on the signal x that includes the N−1 data symbols in the null space of the DC tone (step 202). In particular embodiments, the wireless transmitter 10 may perform this modulation as part of generating a multi-subcarrier signal that includes the signal x for the DC tone as well as signals for all additional tones, or subcarriers, of the multi-subcarrier signal. Lastly, the wireless transmitter 10 transmits the multi-subcarrier signal (step 204). As discussed below, transmission of the multi-subcarrier signal includes, among other things, digital-to-analog conversion, upconversion, and amplification.

Figure 4:
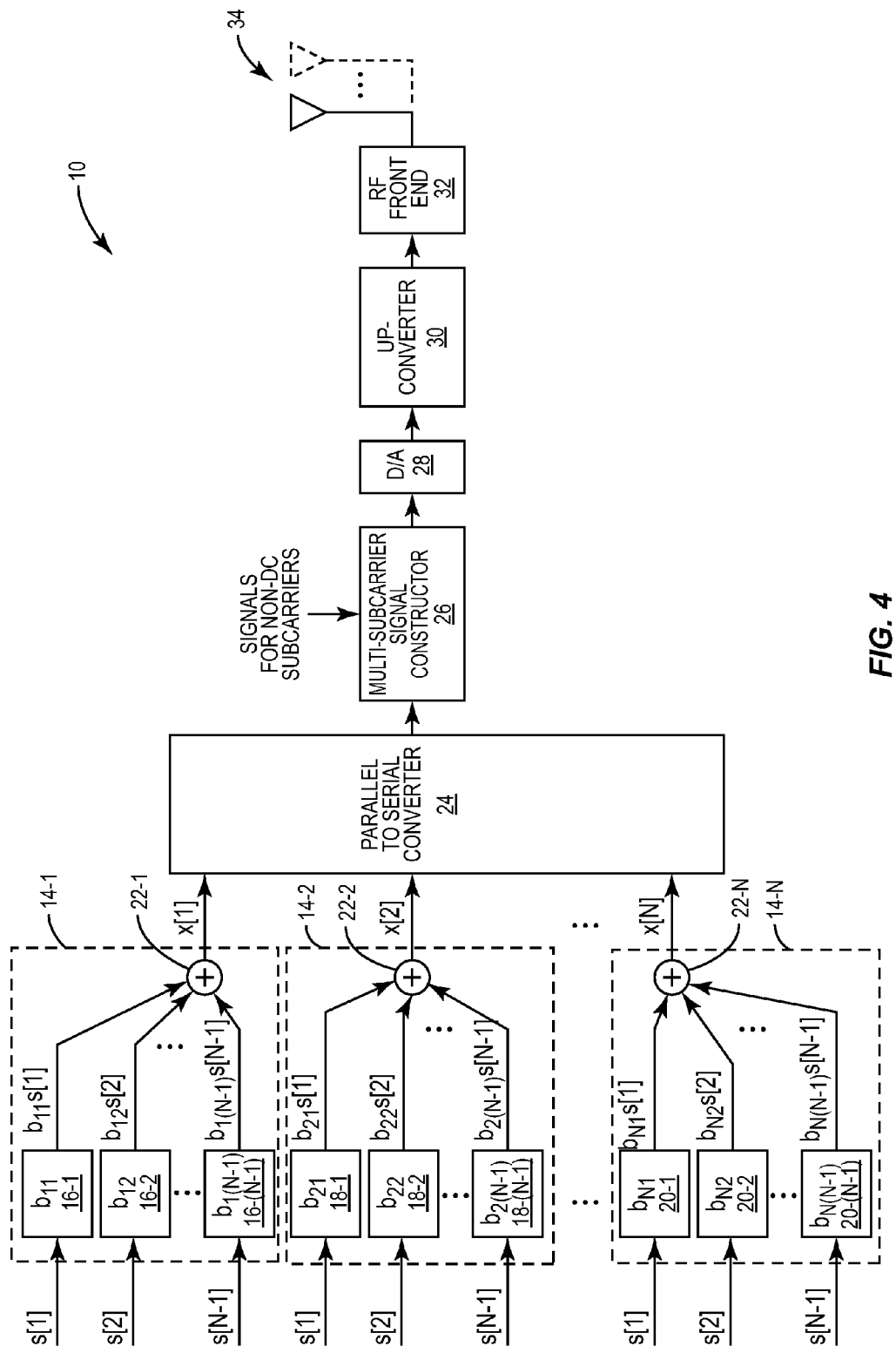
FIG. 4 is a block diagram of a transmitter that transmits data symbols in a null space of a DC tone, or DC subcarrier, of a multi-subcarrier signal according to one embodiment of the present disclosure.

FIG. 4 is a block diagram of the wireless transmitter 10 according to one embodiment of the present disclosure. It should be noted that the embodiment of FIG. 4 is only one example of the wireless transmitter 10. As will be appreciated by one of ordinary skill in the art, the details of the wireless transmitter 10 will vary depending on the particular implementation. In this embodiment, the wireless transmitter 10 operates according to the process of FIG. 3.

As illustrated, the wireless transmitter 10 includes N weighting and combination circuits 14-1 through 14-N that operate to generate linear combinations of the weighted data symbols for each of the N transmission time periods according to Equation (3) above. More specifically, the weighting and combination circuit 14-1 generates the signal component x[1] for the first transmission time period (i.e., for the k-th transmission time period where k=1). In order to generate the signal component x[1], the weighting and combination circuit 14-1 includes weighting circuits 16-1 through 16-(N−1) that operate to weight the N−1 data symbols $\{s[n]\}_{n=1}^{N-1}$ by $\{b_{1n}\}_{n=1}^{N-1}$, respectively, to produce corresponding weighted data symbols. Therefore, the weighting circuit 16-1 weights, or scales, the data symbol s[1] by $b_{11}$, the weighting circuit 16-2 weights, or scales, the data symbol s[2] by $b_{12}$, etc. A combiner 22-1 combines the weighted data symbols output by the weighting circuits 16-1 through 16-(N−1) to produce the signal component x[1].

Likewise, the weighting and combination circuit 14-2 generates the signal component x[2] for the second transmission time period (i.e., for the k-th transmission time period where k=2). In order to generate the signal component x[2], the weighting and combination circuit 14-2 includes weighting circuits 18-1 through 18-(N−1) that operate to weight the N−1 data symbols $\{s[n]\}_{n=1}^{N-1}$ by $\{b_{2n}\}_{n=1}^{N-1}$, respectively, to produce corresponding weighted data symbols. Therefore, the weighting circuit 18-1 weights, or scales, the data symbol s[1] by $b_{21}$, the weighting circuit 18-2 weights, or scales, the data symbol s[2] by $b_{22}$, etc. A combiner 22-2 combines the weighted data symbols output by the weighting circuits 18-1 through 18-(N−1) to produce the signal component x[2].

In the same way, the weighting and combination circuit 14-N generates the signal component x[N] for the N-th transmission time period (i.e., for the k-th transmission time period where k=N). In order to generate the signal component x[N], the weighting and combination circuit 14-N includes weighting circuits 20-1 through 20-(N−1) that operate to weight the N−1 data symbols $\{s[n]\}N_{n=1}^{N-1}$ by $\{b_{Nn}\}_{n=1}^{N-1}$, respectively, to produce corresponding weighted data symbols. Therefore, the weighting circuit 20-1 weights, or scales, the data symbol s[1] by $b_{N1}$, the weighting circuit 20-2 weights, or scales, the data symbol s[2] by $b_{N2}$, etc. A combiner 22-N combines the weighted data symbols output by the weighting circuits 20-1 through 20-(N−1) to produce the signal component x[N]. From the description above, it can be seen that the basis vector $b_1$ carries the data symbol s[1], the basis vector $b_2$ carries the data symbol s[2], etc.

The wireless transmitter 10 also includes a parallel to serial converter 24 that converts the signal components x[k] for the N transmission time periods into a serial stream, which is referred to herein as the signal x for the DC tone. Here, the signal x is a baseband signal. As noted above, the wireless transmitter 10 may then modulate a DC tone, for each of the N transmission time periods, based on this baseband signal x. For example, in particular embodiments, a multi-subcarrier signal constructor 26 aggregates the signal x for the DC tone and signals for the additional tones, or subcarriers, to provide a baseband representation of the multi-subcarrier signal. The baseband representation of the multi-subcarrier signal is then digital-to-analog converted by a digital-to-analog (D/A) converter 28 and upconverted by an upconverter 30 to provide a radio frequency multi-subcarrier signal in which the DC tone carries the N−1 data symbols over the N transmission time periods. The multi-subcarrier signal is then provided to radio frequency (RF) front-end circuitry 32, which, among other things, amplifies the multi-subcarrier signal. The multi-subcarrier signal is then output from the RF front-end circuitry 32 to one or more antennas 34.

Figure 5:
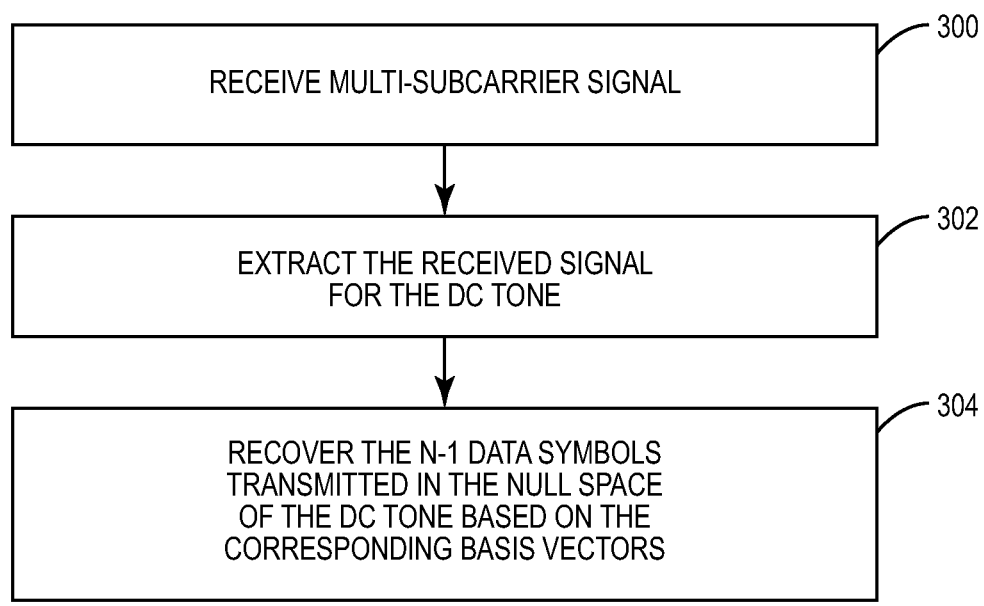
FIG. 5 is a flow chart that illustrates a process for receiving data symbols transmitted in a null space of a DC tone, or DC subcarrier, of a multi-subcarrier signal according to one embodiment of the present disclosure.
Figure 6:
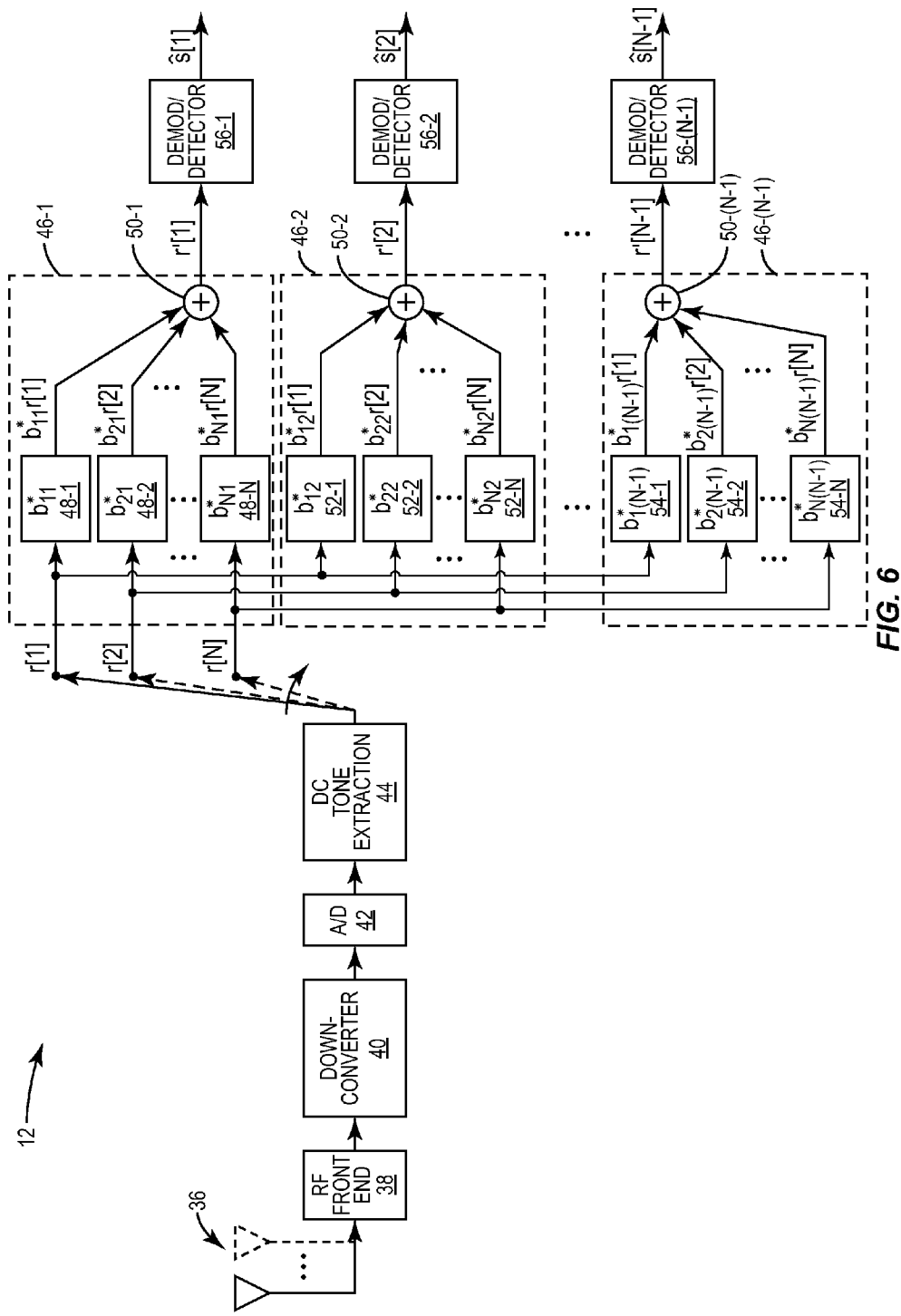
FIG. 6 is a block diagram of a receiver that receives data symbols transmitted in a null space of a DC tone, or DC subcarrier, of a multi-subcarrier signal according to one embodiment of the present disclosure.

While FIGS. 3 and 4 focus on the wireless transmitter 10, FIGS. 5 and 6 focus on the wireless receiver 12 of FIG. 1 according to one embodiment of the present disclosure. More specifically, FIG. 5 is a flow chart that illustrates the operation of the wireless receiver 12 to receive a multi-subcarrier signal and extract data symbols transmitted in a null space of the DC tone according to one embodiment of the present disclosure. First, the wireless receiver 12 receives the multi-subcarrier signal via one or more antennas and appropriate RF front-end circuitry (step 300). The wireless receiver 12 then extracts a received signal for the DC tone from the multi-subcarrier signal (step 302). At this point, a received signal vector r[k] of the received signal r for the DC tone in the k-th transmission time period can be expressed as:

$$r[k] = hx[k] + d + w[k], \quad (4)$$

where h denotes a $n_R \times 1$ channel response vector at the DC tone, $n_R$ denotes the number of antennas of the wireless receiver 12, d denotes a $n_R \times 1$ vector of which each component represents the unknown DC offset of each antenna, and w[k] represents the corresponding $n_R \times 1$ white noise vector observed at the DC tone with covariance matrix $R_w[l] \equiv Ew[k]w[k-l]^H = \sigma^2 \delta[l]I$.

Once the received signal r for the DC tone is extracted, the wireless receiver 12 recovers the N−1 data symbols transmitted in the null space of the DC tone based on the corresponding basis vectors in the set of basis vectors B that characterizes the null space of the DC tone (step 304). In general, as discussed above, in order to transmit the data symbols $\{s[n]\}_{n=1}^{N-1}$ in the null space of the DC tone, each data symbol is carried by a different basis vector $b_i$. Since from Equation (1) each basis vector $b_i$ satisfies:

$$\sum_{k=1}^{N} b_{ki}^* b_{km} = \delta(i-m)$$

for all i=1, 2, ..., N−1 and m=1, 2, ..., N−1, then each data symbol can be recovered by scaling the received signal vectors r[k] of the received signal r for all N transmission time periods (i.e., for all) k=1, 2, ..., N) by $(b_{1i}^*, b_{2i}^*, \ldots, b_{Ni}^*)^T$, respectively, and then combining the resulting scaled received signal vectors. As an example, in order to recover the data symbol s[1], the wireless receiver 12 scales the received signal vectors $\{r[k]\}_{k=1}^{N}$ by $(b_{11}^*, b_{21}^*, \ldots, b_{N1}^*)^T$, respectively, to provide scaled received signal vectors and then combines the scaled received signal vectors. The data symbol s[1] can then be recovered from the combined signal using traditional demodulation or symbol detection techniques.

More specifically, in order to recover the data symbol s[n], the wireless receiver 12 scales and combines the received signal vectors r[k] of the received signal r for all N transmission time periods (i.e., for all k=1, 2, ..., N) to obtain a post-combined received signal vector r'[n] according to the equation:

$$r'[n] = \sum_{k=1}^{N} b_{kn}^* r[k] \quad (5)$$

$$= \sum_{k=1}^{N} b_{kn}^* \left( h \sum_{m=1}^{N-1} b_{km} s[m] + d + w[k] \right)$$

$$= h \sum_{m=1}^{N-1} \left( \sum_{k=1}^{N} b_{kn}^* b_{km} \right) s[m] + \left( \sum_{k=1}^{N} b_{kn}^* \right) d + \sum_{k=1}^{N} b_{kn}^* w[k]$$

Since $$\sum_{k=1}^{N} b_{kn}^* b_{km} = \delta[n-m]$$

and $$\left( \sum_{k=1}^{N} b_{kn}^* \right) = 0,$$

$$r'[n] = hs[m] + w'[k], \quad (6)$$

where $$w'[n] = \sum_{k=1}^{N} b_{kn}^* w[k]$$

denotes the combined noise vector which has an identical covariance matrix as that of w[k] given by:

$$R_{w'}[l] = Ew'[n]w'[n-l]^H \quad (7)$$

$$= \sum_{k=1}^{N} \sum_{m=1}^{N} b_{kn}^* b_{m(n-l)} Ew[k] w[m]^H$$

$$= \sum_{k=1}^{N} \sum_{m=1}^{N} b_{kn}^* b_{m(n-l)} \sigma^2 \delta[k-m] I$$

$$= \sigma^2 I \left( \sum_{k=1}^{N} b_{kn}^* b_{k(n-l)} \right)$$

$$= \sigma^2 \delta[l] I.$$

Hence, the noise vector in the combined received signal vector r'[n] remains white and has the same noise variance as that in the pre-combined received signal vector r[k]. Traditional demodulation or symbol detection techniques can then be used to recover an estimate of the data symbol s[n] from the combined received signal vector r'[n].

FIG. 6 is a block diagram of the wireless receiver 12 according to one embodiment of the present disclosure. It should be noted that the embodiment of FIG. 6 is only one example of the wireless receiver 12. As will be appreciated by one of ordinary skill in the art, the details of the wireless receiver 12 will vary depending on the particular implementation. In this embodiment, the wireless receiver 12 operates according to the process of FIG. 5.

As illustrated, the wireless receiver 12 includes one or more antennas 36 through which the wireless receiver 12 receives a multi-subcarrier signal transmitted by the wireless transmitter 10. The multi-subcarrier signal is passed through RF front-end circuitry 38 of the wireless receiver 12, downconverted by a downconverter 40, and digitized by analog-to-digital (A/D) converter 42 to provide a digital baseband representation of the multi-subcarrier signal. A DC tone extraction circuit 44 then extracts the received signal for the DC tone from the multi-subcarrier signal to thereby provide the received signal vectors $\{r[k]\}_{k=1}^{N}$ for the N transmission time periods to a number, N−1, of scaling and combining circuits 46-1 through 46-(N−1).

The scaling and combining circuit 46-1 scales and combines the received signal vectors $\{r[k]\}_{k=1}^{N}$ using the complex conjugate of the values in the corresponding basis vector $b_i$ used to carry the first data symbol s[1] to thereby provide the combined received signal vector r'[1] for the first data symbol s[1]. The combined received signal vector r'[1] for the first data symbol s[1] is free of, or does not include, the unknown DC offset due to the transmission of the first data symbol s[1] in the null space of the DC tone. More specifically, the scaling and combining circuit 46-1 includes weighting, or scaling, circuits 48-1 through 48-N that operate to scale the received signal vectors r[1], r[2], ..., r[N] by $b_{11}^*, b_{21}^*, \ldots, b_{N1}^*$, respectively, to thereby provide scaled received signal vectors. The scaled received signal vectors output by the weighting circuits 48-1 through 48-N are combined by combining circuitry 50-1 to thereby provide the combined received signal vector r'[1] for the first data symbol s[1]. Notably, in practical implementations, the combining operation implemented by the combining circuitry 50-1 may be performed by accumulating the scaled received signals over the N transmission time periods into a single memory location for the first data symbol s[1] such that only one complex-valued number is stored for the first data symbol s[1].

Likewise, the scaling and combining circuit 46-2 scales and combines the received signal vectors $\{r[k]\}_{k=1}^{N}$ using the complex conjugate of the values in the corresponding basis vector $b_i$ used to carry the second data symbol s[2] to thereby provide the combined received signal vector r'[2] for the second data symbol s[2]. The combined received signal vector r'[2] for the second data symbol s[2] is free of, or does not include, the unknown DC offset due to the transmission of the second data symbol s[2] in the null space of the DC tone. More specifically, the scaling and combining circuit 46-2 includes weighting, or scaling, circuits 52-1 through 52-N that operate to scale the received signal vectors r[1], r[2], ..., r[N] by $b_{12}^*, b_{22}^*, \ldots, b_{N2}^*$, respectively, to thereby provide scaled received signal vectors. The scaled received signal vectors output by the weighting circuits 52-1 through 52-N are combined by combining circuitry 50-2 to thereby provide the combined received signal vector r'[2] for the second data symbol s[2]. Notably, in practical implementations, the combining operation implemented by the combining circuitry 50-2 may be performed by accumulating the scaled received signals over the N transmission time periods into a single memory location for the second data symbol s[2] such that only one complex-valued number is stored for the second data symbol s[2].

In the same manner, the scaling and combining circuit 46-(N−1) scales and combines the received signal vectors $\{r[k]\}_{k=1}^{N}$ using the complex conjugate of the values in the corresponding basis vector $b_i$ used to carry the (N−1)-th data symbol s[N−1] to thereby provide the combined received signal vector r'[N−1] for the (N−1)-th data symbol s[N−1]. The combined received signal vector r'[N−1] for the (N−1)-th data symbol s[N−1] is free of, or does not include, the unknown DC offset due to the transmission of the (N−1)-th data symbol s[N−1] in the null space of the DC tone. More specifically, the scaling and combining circuit 46-(N−1) includes weighting, or scaling, circuits 54-1 through 54-N that operate to scale the received signal vectors r[1], r[2], ..., r[N] by $b_{1(N-1)}^*, b_{2(N-1)}^*, \ldots, b_{N(N-1)}^*$, respectively, to thereby provide scaled received signal vectors. The scaled received signal vectors output by the weighting circuits 54-1 through 54-N are combined by combining circuitry 50-(N−1) to thereby provide the combined received signal vector r'[N−1] for the (N−1)-th data symbol s[N−1]. Notably, in practical implementations, the combining operation implemented by the combining circuitry 50-(N−1) may be performed by accumulating the scaled received signals over the N transmission time periods into a single memory location for the (N−1)-th data symbol s[N−1] such that only one complex-valued number is stored for the (N−1)-th data symbol s[N−1].

Finally, demodulator/detection circuitry 56-1 through 56-(N−1) operates to generate data symbol estimates $\{\hat{s}[n]\}_{n=1}^{N-1}$ for the data symbols $\{s[n]\}_{n=1}^{N-1}$, respectively, from the corresponding combined received signal vectors $\{r'[n]\}_{n=1}^{N-1}$ using traditional, or known, demodulation and symbol detection techniques. From the discussion above, it is clear that the wireless receiver 12 can detect the bits contained in the transmitted data symbols from the corresponding combined received signal vectors $\{r'[n]\}_{n=1}^{N-1}$ using traditional, or known, demodulation and symbol detection techniques without interference from the unknown DC offset. Note that the wireless receiver 12 does not need to estimate the unknown DC offset nor compensate for the unknown DC offset, which can have a substantially different magnitude than the transmitted signal x for the DC tone.

The discussion above primarily focuses on the transmission of data symbols in the null space of the DC tone in the presence of an unknown DC offset. However, the concepts described herein are not limited thereto. More generally, the concepts disclosed herein can be extended to transmit data symbols in the null space of any desired frequency tone, or subcarrier, of a multi-subcarrier signal. For instance, in some applications, an RF front end may generate unwanted sinusoidal signals of unknown magnitude at a non-DC frequency tone. For example, when a receiver attempts to downconvert two carriers of radio signals of different bandwidths into baseband, the mixer frequency at the receiver may not lie at the center of the band of the carrier with a larger bandwidth, and the resulting DC offset may translate into a non-DC frequency tone of unknown amplitude in the downconverted baseband signal for that carrier. Another example that may give rise to an unwanted non-DC frequency tone is inter-modulation distortion produced by non-linear components (e.g., amplifiers) of an RF front end when its input contains multiple carrier signals with different carrier frequencies.

Figure 7:
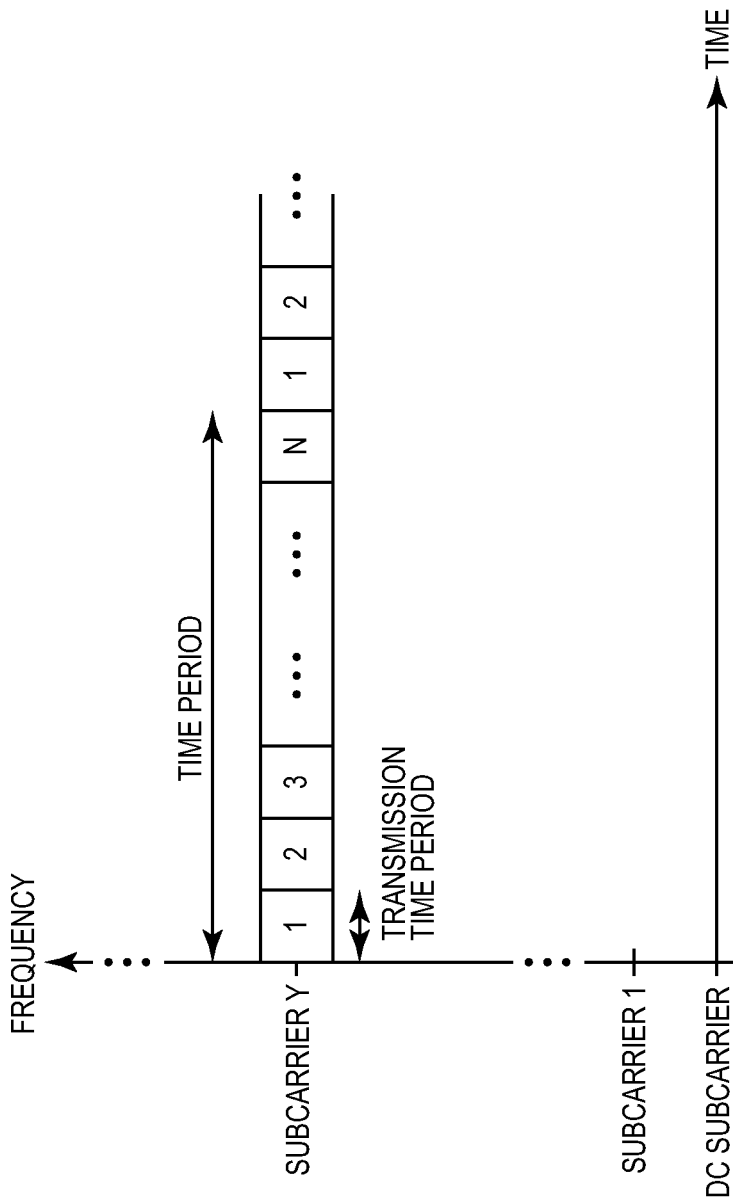
FIG. 7 illustrates a number, N, of transmission time periods in which a number, N−1, of data symbols are transmitted in a null space of a non-DC tone according to one embodiment of the present disclosure.

In this regard, FIGS. 7 through 11 illustrate embodiments of the present disclosure that are similar to those of FIGS. 2 through 6 but where the data symbols are transmitted in the null space of any desired frequency tone (i.e., the DC tone or a non-DC tone). FIG. 7 graphically illustrates a time period that includes N transmission time periods in which N−1 data symbols are transmitted over the null space of a desired frequency tone ($f_o$), or subcarrier, of a multi-subcarrier signal according to one embodiment of the present disclosure. N−1 data symbols are transmitted over N transmission time periods in the null space of the frequency tone ($f_o$). As such, an interference at the frequency tone ($f_o$) that has an unknown and substantially constant magnitude over the N transmission time periods does not interfere with the data symbols.

Let $\{s[n]\}_{n=1}^{N-1}$ denote the number, N−1, of data symbols to be transmitted in the null space of the frequency tone ($f_o$) over the time period of N transmission time periods (e.g., N OFDM symbol periods) over which the magnitude of the interference at the frequency tone ($f_o$) remains substantially constant in a corresponding multi-subcarrier communication system (e.g., an OFDM communication system). Let $B \equiv \{b_i\}_{i=1}^{N-1}$ denote a set of mutually orthogonal N×1 vectors of unit norm, each having its vector components summed to zero. In other words, each vector $b_i \equiv (b_{1i}, b_{2i}, \ldots, b_{Ni})^T$ in B satisfies:

$$\sum_{k=1}^{N} e^{-jf_o T(k)} b_{ki} = 0 \tag{8}$$

and $$\sum_{k=1}^{N} b_{ki}^* b_{km} = \delta(i-m)$$

for all i=1, 2, ..., N−1 and m=1, 2, ..., N−1, where $$T(k) = \sum_{i=1}^{k-1} T_i \text{ and}$$

$T_i$ denotes the i-th transmission time period, which for an OFDM system includes the length of the cyclic prefix. In other words, a sum of the scaled elements of each basis vector in the set of basis vectors B is zero, where the scaling of the elements is a function of the desired frequency tone ($f_o$) and lengths of the transmission time periods. Further, the set of basis factors are mutually orthogonal to each other, and each basis vector in the set of basis vectors B has a unit norm. The set B so constructed forms a basis for the null space of the frequency tone ($f_o$). As such, the set B is also referred to herein as a set of basis vectors B that characterize the null space of the frequency tone ($f_o$), and each vector $b_i$ is also referred to herein as a basis vector.

In one particular embodiment, Equation (8) is satisfied by selecting values for the set of basis vectors B according to:

$$b_{ki} = \frac{1}{\sqrt{N}} \exp\left\{-j\left(\frac{2\pi ki}{N} - f_o T(k)\right)\right\} \quad (9)$$

for i=1, 2, ..., N−1 and k=1, 2, ..., N. More generally, the set of basis vectors B is a set of N−1 columns of a N×N FFT matrix that do not have identical elements, normalized to have unit norms, and rotated according to the desired frequency tone ($f_o$) and the lengths of the transmission time periods. In another particular embodiment, if N is an integer power of two, Equation (8) can be satisfied by selecting $\{b_i\}_{i=1}^{N-1}$ as those N−1 columns of a N×N Walsh-Hadamard matrix that do not have identical elements multiplied by the exponential scaling factors $\{e^{jf_o T(k)}\}_{k=1}^{N}$. Notably, these embodiments of the set of basis vectors B are only two examples. Other values that satisfy Equation (8) above may be selected for the set of basis vectors B.

In operation, each of the N−1 basis vectors in B is used to carry one of the data symbols $\{s[n]\}_{n=1}^{N-1}$ to be transmitted over the time period of N transmission time periods. Specifically, in the k-th transmission time period, the wireless transmitter 10 sends a linear combination of all of the data symbols $\{s[n]\}_{n=1}^{N-1}$ weighted accordingly by $\{b_{kn}\}_{n=1}^{N-1}$ to the wireless receiver 12 over the frequency tone ($f_o$), where the linear combination provides a "signal component" for the frequency tone ($f_o$) given by:

$$x[k] = \sum_{n=1}^{N-1} b_{kn} s[n] \quad (10)$$

for k=1, 2, ..., N. Note that since x[k] is only transmitted over the frequency tone ($f_o$) of the k-th transmission time period, it does not cause any interference to the other subcarriers. Together, the N signal components x[k] for k=1, 2, ..., N form a signal x that includes data symbols in the null space of the frequency tone ($f_o$).

Figure 8:
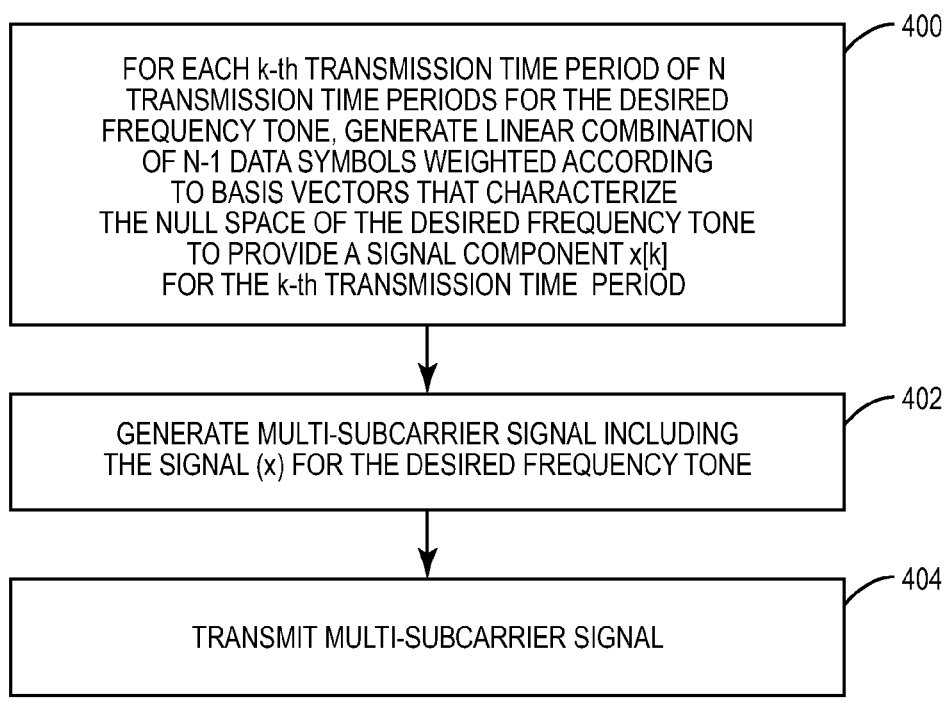
FIG. 8 is a flow chart that illustrates a process for transmitting data symbols in a null space of a desired frequency tone, or desired subcarrier, of a multi-subcarrier signal where the desired frequency tone is either a DC tone or a non-DC tone according to one embodiment of the present disclosure.

FIG. 8 is a flow chart that illustrates the operation of the wireless transmitter 10 of FIG. 1 to utilize the algorithm described above to generate and transmit a signal that includes data symbols in the null space of the frequency tone ($f_o$) according to one embodiment of the present disclosure. First, for each k-th transmission time period of the N transmission time periods, the wireless transmitter 10 generates the linear combination of all of the N−1 data symbols $\{s[n]\}_{n=1}^{N-1}$ weighted according to the basis vectors that characterize the null space of the frequency tone ($f_o$) to provide the signal component x[k] for the k-th transmission time period, as described above with respect to Equation (10) (step 400). Again, together, the N signal components x[k] for k=1, 2, ..., N form a signal x that includes N−1 data symbols in the null space of the frequency tone ($f_o$). Next, in this embodiment, the wireless transmitter 10 generates a multi-subcarrier signal that includes the signal x as well as signals for all additional tones, or subcarriers, of the multi-subcarrier signal (step 402). Lastly, the wireless transmitter 10 transmits the multi-subcarrier signal (step 404). As discussed below, transmission of the multi-subcarrier signal includes, among other things, digital-to-analog conversion, upconversion, and amplification.

Figure 9:
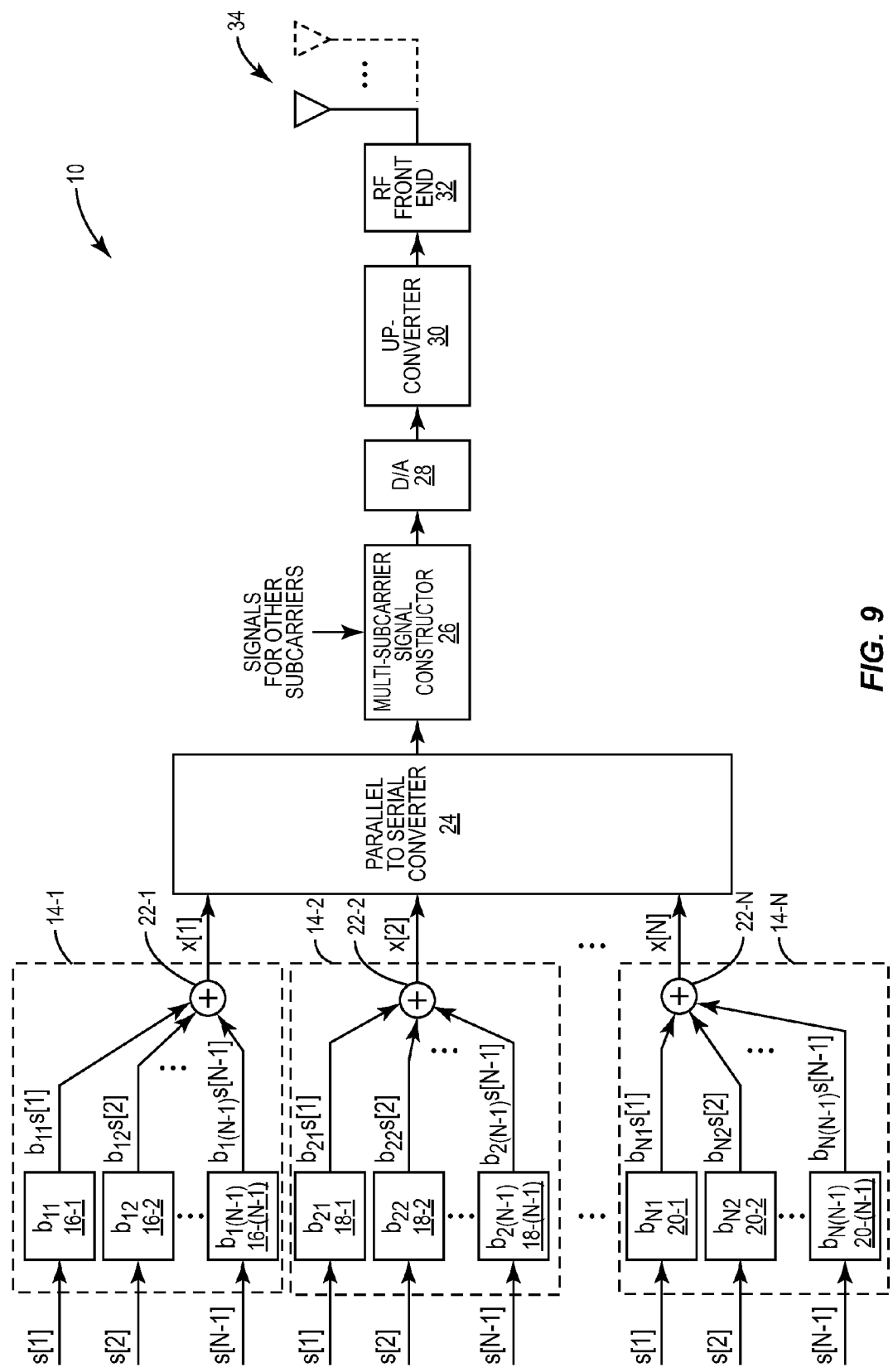
FIG. 9 is a block diagram of a transmitter that transmits data symbols in a null space of a desired frequency tone, or desired subcarrier, of a multi-subcarrier signal where the desired frequency tone is either a DC tone or a non-DC tone according to one embodiment of the present disclosure.

FIG. 9 is a block diagram of the wireless transmitter 10 according to one embodiment of the present disclosure. The wireless transmitter 10 of FIG. 9 is the same as that of FIG. 4 but where the data symbols are transmitted over the null space of the frequency tone ($f_o$) according to the process of FIG. 8. Otherwise, the wireless transmitter 10 of FIG. 9 is the same as that described above with respect to FIG. 4.

While FIGS. 8 and 9 focus on the wireless transmitter 10, FIGS. 10 and 11 focus on the wireless receiver 12 of FIG. 1 wherein the wireless receiver 12 receives a multi-subcarrier signal and recovers data symbols transmitted in the null space of the frequency tone ($f_o$) according to one embodiment of the present disclosure. More specifically, FIG. 10 is a flow chart that illustrates the operation of the wireless receiver 12 to receive a multi-subcarrier signal and extract data symbols transmitted in a null space of the frequency tone ($f_o$) according to one embodiment of the present disclosure. First, the wireless receiver 12 receives the multi-subcarrier signal via one or more antennas and appropriate RF front-end circuitry (step 500). The wireless receiver 12 then extracts a received signal for the frequency tone ($f_o$) from the multi-subcarrier signal (step 502). At this point, a received signal vector r[k] of the received signal r for the DC tone in the k-th transmission time period can be expressed as:

$$r[k] = hx[k] + de^{jf_o T(k)} + w[k], \quad (11)$$

where h denotes a $n_R \times 1$ channel response vector at the DC tone, $n_R$ denotes the number of antennas of the wireless receiver 12, d denotes a $n_R \times 1$ vector of which each component represents the unknown DC offset of each antenna, and w[k] represents the corresponding $n_R \times 1$ white noise vector observed at the DC tone with covariance matrix $R_w[l] = Ew[k]w[k-1]^H = \sigma^2 \delta[l]I$.

Once the received signal r for the frequency tone ($f_o$) is extracted, the wireless receiver 12 recovers the N−1 data symbols transmitted in the null space of the frequency tone ($f_o$) based on the corresponding basis vectors in the set of basis vectors B that characterizes the null space of the frequency tone ($f_o$) (step 504). In general, as discussed above, in order to transmit the data symbols $\{s[n]\}_{n=1}^{N-1}$ in the null space of the frequency tone ($f_o$), each data symbol is carried by a different basis vector $b_i$. Since from Equation (8) each basis vector $b_i$ satisfies:

$$\sum_{k=1}^{N} b_{ki}^* b_{km} = \delta(i-m)$$

for all i=1, 2, ..., N−1 and m=1, 2, ..., N−1, then each data symbol can be recovered by scaling the received signal vectors r[k] of the received signal r for all N transmission time periods (i.e., for all k=1, 2, ..., N) by $(b_{1i}^*, b_{2i}^*, ..., b_{Ni}^*)^T$, respectively, and then combining the resulting scaled received signal vectors. As an example, in order to recover the data symbol s[1], the wireless receiver 12 scales the received signal vectors $\{r[k]\}_{k=1}^{N}$ by $(b_{11}^*, b_{21}^*, ..., b_{N1}^*)^T$, respectively, to provide scaled received signal vectors and then combines the scaled received signal vectors. The data symbol s[1] can then be recovered from the combined signal using traditional demodulation or symbol detection techniques.

More specifically, in order to recover the data symbol s[n], the wireless receiver 12 scales and combines the received signal vectors r[k] of the received signal r for all N transmission time periods (i.e., for all k=1, 2, . . . , N) to obtain a post-combined received signal vector r'[n] according to the equation:

$$r'[n] = \sum_{k=1}^{N} b_{kn}^* r[k] \quad (12)$$

$$= \sum_{k=1}^{N} b_{kn}^* \left( h \sum_{m=1}^{N-1} b_{km} s[m] + d e^{jf_o T(k)} + w[k] \right)$$

$$= h \sum_{m=1}^{N-1} \left( \sum_{k=1}^{N} b_{kn}^* b_{km} \right) s[m] + \left( \sum_{k=1}^{N} b_{kn}^* e^{jf_o T(k)} \right) d +$$

$$\sum_{k=1}^{N} b_{kn}^* w[k]$$

Since $$\sum_{k=1}^{N} b_{kn}^* b_{km} = \delta[n-m]$$

and $$\left( \sum_{k=1}^{N} b_{kn}^* e^{jf_o T(k)} \right) = 0,$$

$$r'[n] = h s[m] + w''[k], \quad (13)$$

where $$w''[n] = \sum_{k=1}^{N} b_{kn}^* w[k]$$

denotes the combined noise vector which has an identical covariance matrix as that of w[k] given by:

$$R_{w'}[l] = E w''[n] w''[n-l]^H \quad (14)$$

$$= \sum_{k=1}^{N} \sum_{m=1}^{N} b_{kn}^* b_{m(n-l)} E w[k] w[m]^H$$

$$= \sum_{k=1}^{N} \sum_{m=1}^{N} b_{kn}^* b_{m(n-l)} \sigma^2 \delta[k-m] I$$

$$= \sigma^2 I \left( \sum_{k=1}^{N} b_{kn}^* b_{k(n-l)} \right)$$

$$= \sigma^2 \delta[l] I.$$

Hence, the noise vector in the combined received signal vector r'[n] remains white and has the same noise variance as that in the pre-combined received signal vector r[k]. Traditional demodulation or symbol detection techniques can then be used to recover an estimate of the data symbol s[n] from the combined received signal vector r'[n].

FIG. 11 is a block diagram of the wireless receiver 12 according to one embodiment of the present disclosure. The wireless receiver 12 of FIG. 11 is the same as that of FIG. 6 but where the data symbols are transmitted over the null space of the frequency tone ($f_o$) according to the process of FIG. 10. As such, desired frequency tone ($f_o$) extraction circuitry 44' operates to extract the received signal at the desired frequency tone ($f_o$), which may or may not be the DC tone. Otherwise, the wireless receiver 12 of FIG. 11 is the same as that described above with respect to FIG. 6.

The concepts described herein enable wireless communication in the null space of a desired frequency tone, which may be either a DC tone or a non-DC tone. While there are many advantages to such communication, one example is that base stations and mobile terminals in multi-subcarrier communication systems (e.g., OFDM communication systems such as LTE and WiMAX communication networks) that do not traditionally use the DC subcarrier are enabled to create a separate, and possibility proprietary, logical channel over the DC subcarrier in either the downlink or uplink. As another example, device-to-device communication between mobile terminals may piggyback over an existing multi-subcarrier communication system (e.g., an OFDM system) that does not utilize the DC subcarrier (or some other unused subcarrier within a spectrum allocated for transmissions in the communication system) without causing any interference to other communication links established using the other subcarriers.

For example, a terminal operating in a particular system may identify a particular subcarrier (e.g., based on broadcast system information, the terminal's existing configuration, monitoring of the relevant subcarrier performed by the terminal, and/or other appropriate considerations) that the network refrains from scheduling and/or that the system does not otherwise use for normal network-routed communications. The terminal may then modulate the identified subcarrier, for N transmission time periods, based on a signal that includes data symbols that are generated in the null space of the identified subcarrier, as described above. In a direct device-to-device communication embodiment, the terminal may then transmit the modulated signal to another terminal or communication device directly, thereby bypassing the base station.

The following acronyms are used throughout this disclosure.
A/D Analog-to-Digital
D/A Digital-to-Analog
FFT Fast Fourier Transform
LO Local Oscillator
LTE Long Term Evolution
OFDM Orthogonal Frequency Division Multiplexing
RF Radio Frequency Those skilled in the art will recognize improvements and modifications to the preferred embodiments of the present disclosure. All such improvements and modifications are considered within the scope of the concepts disclosed herein and the claims that follow.

What is claimed is:

1. A method of operation of a wireless transmitter comprising:
   generating, by the wireless transmitter, a signal comprising data symbols in a null space of a predetermined frequency, wherein generating the signal comprises:
      for each k-th transmission time period of a number, N, of transmission time periods where k=1, 2, . . . , N and N is an integer:
         weighting each n-th data symbol of a number, N−1, of data symbols according to a k-th element of a different basis vector in a set of basis vectors that characterize the null space of the predetermined frequency to thereby provide weighted data symbols for the k-th transmission time period, where n=1, 2, . . . , N−1; and
         linearly combining the weighted data symbols for the k-th transmission time period to provide a signal component for the k-th transmission time period for the predetermined frequency;

for the number, N, of transmission time periods, modulating, based on the generated signal, a tone having the predetermined frequency; and
transmitting the modulated tone.

2. The method of claim 1 wherein the predetermined frequency is one of a plurality of subcarriers of a multi-subcarrier signal, and transmitting the modulated tone comprises transmitting the multi-subcarrier signal such that the modulated tone is the one of the plurality of subcarriers of the multi-subcarrier signal.

3. The method of claim 2 wherein the multi-subcarrier signal is an Orthogonal Frequency Divisional Multiplexing signal.

4. The method of claim 1 wherein the predetermined frequency is a direct current tone, and a sum of the elements of each basis vector in the set of basis vectors is zero.

5. The method of claim 4 wherein the set of basis vectors further satisfies that the basis vectors in the set of basis vectors are mutually orthogonal to each other and that each basis vector in the set of basis vectors has a unit norm.

6. The method of claim 5 wherein the set of basis vectors is a set of N−1 columns of a N×N Fast Fourier Transform matrix that do not have identical elements, normalized so that each basis vector in the set of basis vectors has a unit norm.

7. The method of claim 5 wherein N is an integer power of two, and the set of basis vectors is a set of N−1 columns of a N×N Walsh-Hadamard matrix that do not have identical elements.

8. The method of claim 1 wherein the elements of each basis vector in the set of basis vectors are scaled as a function of the predetermined frequency and lengths of the transmission time periods to provide scaled elements of each basis vector in the set of basis vectors, and a sum of the scaled elements of each basis vector in the set of basis vectors is zero.

9. The method of claim 8 wherein the set of basis vectors further satisfies that the basis vectors in the set of basis vectors are mutually orthogonal to each other and that each basis vector in the set of basis vectors has a unit norm.

10. The method of claim 9 wherein the set of basis vectors is a set of N−1 columns of a N×N Fast Fourier Transform matrix that do not have identical elements, normalized to have unit norms, and rotated according to the predetermined frequency and the lengths of the transmission time periods.

11. The method of claim 9 wherein N is an integer power of two, and the set of basis vectors is a set of N−1 columns of a N×N Walsh-Hadamard matrix that do not have identical elements scaled by factors $\{e^{jf_oT(k)}\}_{k=1}^{N}$, where $$T(k) = \sum_{i=1}^{k-1} T_i,$$

denotes an $i^{th}$ transmission time period, and $f_0$ denotes the predetermined frequency.

12. The method of claim 1 wherein the predetermined frequency is a direct current tone.

13. The method of claim 1 wherein the predetermined frequency is a non-direct current tone.

14. The method of claim 1, wherein transmitting the modulated tone comprises transmitting the modulated tone using a homodyne radio transmitter.

15. The method of claim 14 wherein modulating the tone having the predetermined frequency comprises:
upconverting the generated signal from a baseband frequency directly to a radio signal frequency without converting the generated signal to an intermediate frequency.

16. The method of claim 1 wherein the predetermined frequency comprises a frequency for use in direct device-to-device communication, and wherein transmitting the modulated tone comprises transmitting the modulated tone from a first mobile terminal directly to a second mobile terminal.

17. A transmitter comprising:
circuitry configured to:
generate a signal comprising data symbols in a null space of a predetermined frequency by being configured to:
for each k-th transmission time period of a number, N, of transmission time periods where k=1, 2, . . . , N and N is an integer:
weight each n-th data symbol of a number, N−1, of data symbols according to a k-th element of a different basis vector in a set of basis vectors that characterize the null space of the predetermined frequency to thereby provide weighted data symbols for the k-th transmission time period, where n=1, 2, . . . , N−1; and
linearly combine the weighted data symbols for the k-th transmission time period to provide a signal component for the k-th transmission time period for the predetermined frequency; and
for the number, N, of transmission time periods, modulate, based on the generated signal, a tone having the predetermined frequency; and
radio frequency front-end circuitry configured to transmit the modulated tone.

18. The transmitter of claim 17 wherein the predetermined frequency is one of a plurality of subcarriers of a multi-subcarrier signal, and the radio frequency front-end circuitry is configured to transmit the multi-subcarrier signal such that the signal is a signal carried by the one of the plurality of subcarriers of the multi-subcarrier signal.

19. The transmitter of claim 18 wherein the multi-subcarrier signal is an Orthogonal Frequency Divisional Multiplexing signal.

20. The transmitter of claim 17 wherein the predetermined frequency is a direct current tone, and a sum of the elements of each basis vector in the set of basis vectors is zero.

21. The transmitter of claim 20 wherein the set of basis vectors further satisfies that the basis vectors in the set of basis vectors are mutually orthogonal to each other and that each basis vector in the set of basis vectors has a unit norm.

22. The transmitter of claim 21 wherein the set of basis vectors is a set of N−1 columns of a N×N Fast Fourier Transform matrix that do not have identical elements, normalized so that each basis vector in the set of basis vectors has a unit norm.

23. The transmitter of claim 21 wherein N is an integer power of two, and the set of basis vectors is a set of N−1 columns of a N×N Walsh-Hadamard matrix that do not have identical elements.

24. The transmitter of claim 17 wherein the elements of each basis vector in the set of basis vectors are scaled as a function of the predetermined frequency and lengths of the transmission time periods to provide scaled elements of each basis vector in the set of basis vectors, and a sum of the scaled elements of each basis vector in the set of basis vectors is zero.

25. The transmitter of claim 24 wherein the set of basis vectors further satisfies that the basis vectors in the set of basis vectors are mutually orthogonal to each other and that each basis vector in the set of basis vectors has a unit norm.

26. The transmitter of claim 25 wherein the set of basis vectors is a set of N−1 columns of a N×N Fast Fourier Transform matrix that do not have identical elements, normalized to have unit norms, and rotated according to the predetermined frequency and the lengths of the transmission time periods.

27. The transmitter of claim 25 wherein N is an integer power of two, and the set of basis vectors is a set of N−1 columns of a N×N Walsh-Hadamard matrix that do not have identical elements scaled by factors $\{e^{jf_oT(k)}\}_{k=1}^{N}$, where $$T(k) = \sum_{i=1}^{k-1} T_i,$$

denotes an $i^{th}$ transmission time period, and $f_0$ denotes the predetermined frequency.

28. The transmitter of claim 17 wherein the predetermined frequency is a direct current tone.

29. The transmitter of claim 17 wherein the predetermined frequency is a non-direct current tone.

30. The transmitter of claim 17 wherein the circuitry is configured to transmit the modulated tone by transmitting the modulated tone using a homodyne radio transmitter.

31. The transmitter of claim 30 wherein the circuitry is configured to modulate the tone having the predetermined frequency by upconverting the generated signal from a baseband frequency directly to a radio signal frequency without converting the generated signal to an intermediate frequency.

32. The transmitter of claim 17, wherein the predetermined frequency comprises a frequency for use in direct device-to-device communication, and wherein the radio frequency front-end circuitry is configured to transmit the modulated tone by transmitting the modulated tone from a first mobile terminal directly to a second mobile terminal.

33. A method of operation of a wireless receiver comprising:

receiving, by the wireless receiver, a signal comprising a number of data symbols in a null space of a predetermined frequency; and recovering the number of data symbols from the signal by:
for each n-th data symbol of the number of data symbols:
weighting each k-th transmission time period of a number, N, of transmission time periods where k=1, 2, ..., N and N is an integer according to a complex conjugate of a k-th element of a different basis vector in a set of basis vectors that characterize the null space of the predetermined frequency to thereby provide weighted transmission time periods for the n-th data symbol; and
linearly combining the weighted transmission time periods for the n-th data symbol to provide the number of data symbols.

34. A wireless receiver comprising:

radio frequency front-end circuitry configured to receive a signal comprising a number of data symbols in a null space of a predetermined frequency; and circuitry configured to recover the number of data symbols from the signal by being configured to:
for each n-th data symbol of the number of data symbols:
weighting each k-th transmission time period of a number, N, of transmission time periods where k=1, 2, ..., N and N is an integer according to a complex conjugate of a k-th element of a different basis vector in a set of basis vectors that characterize the null space of the predetermined frequency to thereby provide weighted transmission time periods for the n-th data symbol; and
linearly combining the weighted transmission time periods for the n-th data symbol to provide the number of data symbols.

* * * * *

UNITED STATES PATENT AND TRADEMARK OFFICE
CERTIFICATE OF CORRECTION

PATENT NO. : 8,824,580 B2
APPLICATION NO. : 13/584082
DATED : September 2, 2014
INVENTOR(S) : Hui Page 1 of 1

It is certified that error appears in the above-identified patent and that said Letters Patent is hereby corrected as shown below:

In the Specification

In Column 9, Line 24, delete "all)" and insert -- all --, therefor.

In Column 13, Line 16, delete "Bis" and insert -- B is --, therefor.

In the Claims

In Column 17, Line 53, in Claim 11, delete "denotes" and insert -- $T_i$ denotes --, therefor.

In Column 19, Line 14, in Claim 27, delete "denotes" and insert -- $T_i$ denotes --, therefor.

Signed and Sealed this
Fifth Day of July, 2016

Michelle K. Lee
*Director of the United States Patent and Trademark Office*